ENERGY LEVELS AND TRANSITIONS
IN A TWO-STEP PHOSPHOR

EMISSION SPECTRUM OF $(La_{0.79}Yb_{0.20}Er_{0.01})_2O_2S$

Inventor:
Ralph A. Hewes
by *Richard H. Burgess*
His Attorney

United States Patent Office 3,541,022
Patented Nov. 17, 1970

---

3,541,022
INFRARED EXCITABLE YTTERBIUM SENSITIZED ERBIUM ACTIVATED RARE EARTH OXYSULFIDE LUMINESCENT MATERIAL
Ralph A. Hewes, Cleveland Heights, Ohio, assignor to General Electric Company, a corporation of New York
Filed Mar. 28, 1968, Ser. No. 716,921
Int. Cl. C09k 1/14
U.S. Cl. 252—301.4                  8 Claims

ABSTRACT OF THE DISCLOSURE

Oxysulfides of lanthanum, gadolinium and yttrium, activated with erbium, and containing ytterbium as a sensitizer can be efficiently excited to green luminescence by infrared radiation, and they can be used in certain light-producing applications. Such materials can be made by reacting the respective oxides, preferably mixed, with an atmosphere of $H_2S$ and $N_2$.

CROSS-REFERENCES TO RELATED APPLICATIONS

Concurrently filed copending application Ser. No. 716,898, Ralph A. Hewes and James F. Sarver, discloses and claims erbium- or thulium-activated, ytterbium-sensitized fluorides of lanthanum, gadolinium and yttrium. That Hewes and Sarver application has now been abandoned in favor of continuation-in-part application Ser. No. 767,038, filed Sept 18, 1968.

A specific application of the luminescent materials of the present invention is described in detail and claimed in concurrently filed copending application Ser. No. 716,897, filed in the name of Ralph M. Potter and Simeon V. Galginaitis, hereby incorporated into this application by reference. That application in certain embodiments involves use of a doped gallium arsenide infrared-emitting diode coated with phosphor which can be phosphor of the present invention or similar phosphors. The infrared radiation emitted by the diode and the excitation spectrum of the phosphor interact as a combination to produce visible light.

The three above-cited applications are assigned to the assignee of the present invention.

BACKGROUND OF THE INVENTION

The present invention relates to inorganic crystalline luminescent material. More particularly, it relates to such material which can be excited to produce visible radiation by infrared stimulation.

In 1852, Stokes noted that fluorescent light was usually less refrangible (had longer wavelengths) than the exciting light. The proposition that longer wavelength light could not normally be used to generate shorter wavelength light in phosphors became known as Stokes Law, and the few phosphors which were exceptions to this law were eventually known as anti-Stokes phosphors. Since infrared light is beyond the long-wavelength end of the visible spectrum, any light-emitting, infrared-stimulable phosphors would be anti-Stokes phosphors. No such infrared-stimulable phosphors have been known to be sufficiently efficient for the production of visible light in commercially feasible devices.

Essentially all present commercial applications of phosphors for the production of visible light by photoluminescent excitation utilize ultraviolet or, in some cases, visible light excitation. Such ultraviolet or visible exciting light is normally produced in commercial lamps by electric discharges in arcs.

Incandescent lamps, on the other hand, produce light by heating a filament to incandescent temperatures at which substantial amounts of visible light are emitted. However, large amounts of the input energy used to heat the filament to incandescence are dissipated as infrared light also produced by the incandescent filament. It would be very desirable to have an efficient phosphor which could convert such infrared light to visible light, thereby supplementing the visible light portion of the output of an incandescent lamp and utilizing the otherwise wasted infrared emission.

Other light sources can be made to emit primarily infrared light, such as the gallium arsenide light-emitting diode disclosed and claimed in the above-identified application of Potter and Galginaitis in conjunction with certain phosphors.

It would be desirable to have a phosphor which could be excited by such infrared emission to produce light within the visible spectrum, but the few previously known infrared-stimulable anti-Stokes phosphors have not been sufficiently efficient to allow the production of a practical commercial product.

There are various scientific reasons why the light emitted by a phosphor is normally at longer wavelengths than the exciting light. Considered from the standpoint of electronic energy levels, after photoexcitation by light of a certain wavelength, there is some non-radiative energy decay or relaxation before the light-emitting transition back down to the ground state energy level, due to interaction of the activator with the lattice. Thus, the light emission comes from a smaller energy transition and is therefore of longer wavelength than the excitation. However, one anti-Stokes luminescent mechanism involves the use of double excitation. A quantum of light excites an electron up to one level, and then another quantum of light excites the same electron to a higher energy level. From this higher energy level, the electron can relax somewhat to a slightly lower level, and from there go through a transition back to the original ground state, thus producing light equivalent to an energy transition greater than the initial energy input but less than the total energy input from the two quanta. Being a higher energy transition than either of the input quanta, the emitted light has a shorter wavelength than the average wavelength of the exciting light. The two input quanta, of course, could either be of the same wavelength or of different wavelengths.

Such infrared-stimulable phosphors have been used in the past in infrared quantum counters. Phosphors that can produce shorter wavelength light from longer wavelength excitation have been shown to include:

$$ZnCdS:Ag,Cu$$

by R. M. Potter, J. Electrochem. Soc., 106, 58 C (1959), producing green light with orange and infrared excitation at room temperature; and $LaCl_3:Pr^{3+}$ by John F. Porter, Jr., Phys. Rev. Letters, 7, 414 (1961). Other phosphors useful for such purposes have been shown to include: $Na_{0.5}Yb_{0.49}Er_{0.01}WO_4$ by F. Auzel, Compt. Rend., 262 B, 1016 (1966); $CaWO_4:Er$, and $(Ca,Ba)F_2:(Tm,Er,Ho),Yb$; however, none of these phosphors were sufficiently bright to be usable commercially for the production of visible radiation by utilizing infrared radiation.

SUMMARY OF THE INVENTION

It is an object of the present invention to provide an efficient infrared-stimulable, visible light-emitting luminescent material.

Briefly stated, the present invention in certain of its embodiments provides an oxysulfide of at least one of the metals lanthanum, gadolinium and yttrium, activated by erbium and containing sufficient quantities of ytterbium in the matrix to enhance the luminescence of said oxysulfide in response to excitation by infrared light. Preferred forms of such materials contain activator quantities of erbium, preferably 0.0025 to 0.10 mole, and sensitizer quantities of ytterbium, preferably 0.05 to 0.40 mole, each measured per ½ mole of oxysulfide. These phosphors are generally in accord with the formula $$(Ln_{1-x-y}Yb_xEr_y)_2O_2S$$

wherein Ln is Y, La, or Gd, and one optimum specific formula of the invention is $(La_{0.79}Yb_{0.20}Er_{0.01})_2O_2S$.

DESCRIPTION OF THE PREFERRED EMBODIMENTS

In phosphors of the present invention, the Yb acts as a sensitizer, absorbing in a broad band peaking at $0.975\mu$, and transfers the energy to the erbium activator ion by various mechanisms. At least two infrared quanta are required to produce one visible light quantum.

Figure 1:
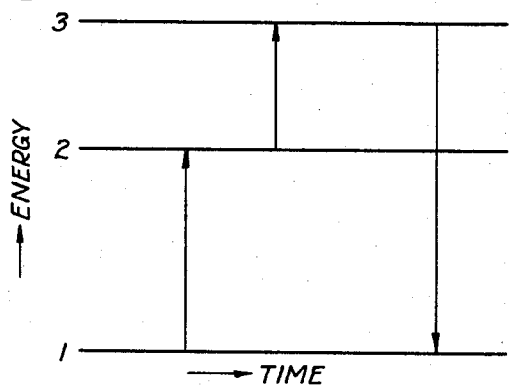
FIG. 1 is a general schematic energy level diagram of a two-step excitation and luminescence process.

FIG. 1 illustrates in the simplest form a process of excitation by two photons followed by a luminescent transition of higher energy than either of the two input photons.

Figure 2:
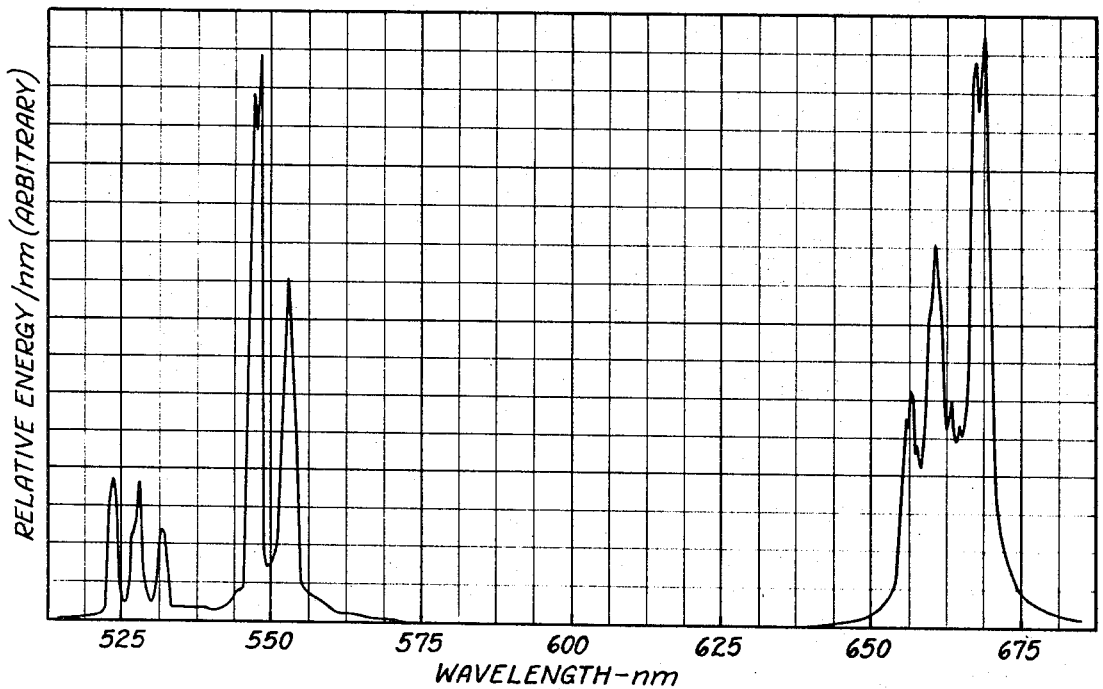
FIG. 2 is the emission spectrum of $$(La_{0.79}Yb_{0.20}Er_{0.01})_2O_2S$$

The emission spectrum of $(La_{0.79}Yb_{0.20}Er_{0.01})_2O_2S$, shown in FIG. 2, is typical of these activators in the host lattices of phosphors of the invention.

In general, 99.9% pure rare earth oxides such as $Yb_2O_3$, $Er_2O_3$, $Gd_2O_3$, and $Y_2O_3$ (99.997% in case of $La_2O_3$) are used as starting materials. Higher purity $La_2O_3$ (99.999%) can also be used, although no obvious benefits in phosphor efficiency are realized. High purity $H_2S$ or $Na_2S_4$ supplies the sulfide for the reaction.

Phosphors of the invention can be conveniently prepared by first coprecipitating ytterbium and erbium with lanthanum, yttrium or gadolinium in the from of an oxalate by well known methods using, for example, solutions of oxalic acid, and nitrates of ytterbium, erbium, and the rare earth selected for the host. The oxalate is ignited to the oxide preferably between 800 and 1200° C. in 1 to 4 hours in open crucibles in air. The oxides are converted to the oxysulfide by firing in open boats in a flowing atmosphere consisting of $H_2S$ and $N_2$ mixtures (suitable ratios are 50 parts by volume of $H_2S$ and 200 parts by volume of $N_2$) for 1 to 4 hours at temperatures from 800 to 1350° C.

A second method of preparing the oxysulfides from the oxides consists of blending together approximately equimolar amounts of $La_2O_3$, or $Gd_2O_3$, or $Y_2O_3$ (previously coprecipitated with ytterbium and erbium as the oxalate and fired to the oxide as described above) with $Na_2S_4$ and firing in an inert atmosphere for 2 to 4 hours at 1100 to 1200° C. The reaction mixture is washed in hot water to remove the soluble $Na_2S$ reaction product. The oxide is converted to the oxysulfide and at the same time recrystallized to larger single crystals suitable for any intended end use that could utilize such larger crystals.

Evidence of Yb sensitization of Er in phosphors of the invention as compared with corresponding unsensitized phosphor is presented in the form of approximate relative efficiencies in Table I below.

TABLE I
Yb Sensitization of Ln-Oxysulfides

| Unsensitized | | Sensitized | |
|---|---|---|---|
| Composition | Rel. eff. | Composition | Rel. eff. |
| $(La_{0.99}Er_{0.01})_2O_2S$ | 570 | $(Yb_{0.99}Er_{0.01})_2O_2S$ | 26 |
| | | $(La_{0.79}Yb_{0.20}Er_{0.01})_2O_2S$ | 3,830 |
| | | $(La_{0.78}Yb_{0.20}Er_{0.02})_2O_2S$ | 1,000 |
| | | $(La_{0.89}Yb_{0.10}Er_{0.01})_2O_2S$ | 600 |
| $(Gd_{0.99}Er_{0.01})_2O_2S$ | 290 | $(La_{0.895}Yb_{0.10}Er_{0.005})_2O_2S$ | 40 |
| $(Y_{0.99}Er_{0.01})_2O_2S$ | 160 | $(La_{0.59}Yb_{0.40}Er_{0.01})_2O_2S$ | 29.3 |

The foregoing is a description of illustrative embodiments of the invention, and it is applicant's intention in the appended claims to cover all forms which fall within the scope of the invention.

What I claim as new and desire to secure by Letters Patent of the United States is:

1. Luminescent material consisting essentially of: an oxysulfide of at least one of the metals lanthanum, gadolinium, and yttrium, activated by erbium and containing sufficient quantities of ytterbium in the matrix to enhance the luminescence of said oxysulfide in response to excitation by infrared light.

2. Luminescent material according to claim 1 containing between about 0.05 and 0.40 mole of ytterbium per ½ mole of oxysulfide.

3. Luminescent material according to claim 1 containing between about 0.0025 and 0.10 mole of erbium per ½ mole of oxysulfide.

4. Luminescent material according to claim 1 in which the matrix is lanthanum oxysulfide.

5. Luminescent material according to claim 1 in which the matrix is yttrium oxysulfide.

6. Luminescent material according to claim 1 in which the matrix material is gadolinium oxysulfide.

7. Luminescent material according to claim 1 and having the formula $$(Ln_{1-x-y}Yb_xEr_y)_2O_2S$$

wherein Ln is at least one of Y, La, and Gd, $x$ is about between 0.05 and 0.40, and $y$ is about between 0.0025 and 0.10.

8. Luminescent material according to claim 7 having approximately the formula $$(La_{0.79}Yb_{0.20}Er_{0.01})_2O_2S$$

References Cited

UNITED STATES PATENTS 3,405,371 10/1968 Johnson et al. _____ 252—301.4
3,418,246 12/1968 Royce.
3,418,247 12/1968 Yocom.

OTHER REFERENCES

Snitzer et al., $Yb^{3+}$–$Er^{3+}$ Glass Laser, Applied Physics Letters, vol. 6, No. 3; Feb. 1, 1965, pp. 45–6.

TOBIAS E. LEVOW, Primary Examiner

R. D. EDMONDS, Assistant Examiner